3,551,135
ASPHALT CONTAINING FATTY ALCOHOLS AS PLANT ROOT GROWTH RETARDANTS
Joachim Pütz, Holm-Seppensen, and Franz Sebald, Munich, Germany, assignors to Deutsche Erdol Aktiengesellschaft, Hamburg, Germany, a corporation of Germany
No Drawing. Filed June 21, 1966, Ser. No. 559,094
Claims priority, application Germany, June 24, 1965, 1,570,087
Int. Cl. A01n 9/04, 9/24, 17/08
U.S. Cl. 71—122                            1 Claim

ABSTRACT OF THE DISCLOSURE

The combination of a bituminous material and a higher fatty alcohol used as a root repelling composition.

---

This invention relates to the prevention of the growth of roots. It more particularly refers to the prevention of the penetration of roots into underground and ground surface structures and systems.

When pipelines, cables and similar underground structures are laid, care must be taken to insure that plant root systems do not penetrate them or penetrate their protective covering if one is used. This is particularly true where the underground system is laid close to the surface as for example, in those situations where the ground watertable is fairly high and it is desired to keep the underground system above the watertable as much as possible.

Underground pipes are generally laid in sections with joints of one sort or another between sections. It is common practice to provide gasketing or sealing material in the joints to prevent leakage of the material carried by the pipe into the surrounding soil as well as to prevent leakage of dirt and ground water into the pipe.

In a similar manner, electrical conduits which are laid under ground, are often jointed and these joints are similarly gasketed to prevent intrusion of ground water which might cause a short circuit. It is often desirable to provide metal pipes and conduits with a non-metallic coating thereon in order to provide insulation to the pipe and also to retard or prevent corrosion of the pipe or conduit.

As can be appreciated if roots grow in such a manner that they penetrate the gasketing material or the coating material, this can lead to leakage from or into the pipe or conduit and can also cause ground water to obtain access to metallic pipes which can lead to corrosion and severe damage.

Not only is root penetration a problem in underground systems of the type described but this is also a distinct and severe problem with surface structures such as roadway beds and the like. Where roots grow through asphalt or other similar surface materials, they cause the material to crack, become porous and thus less satisfactory for their intended purpose. Further, it may happen that seeds disposed on top of asphalt can sprout if they can send their root systems through the asphalt into the ground below.

It is clear that it is necessary to prevent or at least retard the growth of root systems in surface and underground structures which are susceptible to penetration by reason of root growth. In the past, many materials have been used in combination with penetratable building materials, such as asphalt or other bituminous or non-metallic materials, for the purpose of preventing or retarding the growth and penetration of root systems therein. Among these known materials can be mentioned chlorophenols and cresols, particularly pentachlorophenol; condensation products of monochloroacetic acid with various chlorinated phenols and cresols, for example, 2,4-dichlorophenoxy acetic acid; sodium dinitro-o-cresylate; 2,4-dinitrobutylphenol; copper naphthenate; triethyltinhydroxide and the like.

While many of these prior art materials have been used with a greater or lesser degree of success, these materials have not necessarily been found to be the complete answer to the problem for various reasons. Many of the known root growth preventatives are physiologically objectionable. Some of these materials are relatively volatile and much of the additive is lost without accomplishing its purpose. Further, some of these prior used root growth retardants are readily leached out of active association with the pipe or conduit etc. by ground water.

It is an object of this invention to provide a novel root growth retardant agent.

It is a further object of this invention to provide a means for protecting non-metallic underground or surfaces structures against root system penetration.

Other and additional objects of this invention will become apparent from a consideration of this entire specification including the claims appended hereto.

In accord with and fulfilling these objects, this invention includes the use of higher fatty alcohols to provide protection against root system penetration of non-metallic ground structures. The alcohols which are useful in this invention include saturated aliphatic alcohols of about 6 to 20 carbon atom chain length. It is preferred to use primary alcohols of about 8 to 18 carbon atom chain length. These alcohols may be used individually as pure or technical grade materials or in mixtures such as for example, a mixed $C_8$–$C_{14}$ alcohol fraction.

Particular exemplary alcohols include n-octanol, decanol, lauryl alcohol, stearyl alcohol, dodecanol and the like. These alcohols are readily available on the open market both as pure or substantially pure materials as well as in mixtures. If desired, these material can be readily made by known processes such as for example, by oxo-synthesis, aldol condensation, olefin hydration or carboxylic acid hydrogenation.

It is preferred in the practice of this invention to use the alcohol in admixture with the non-metallic material, e.g., the gasketing, road bed or road surfacing material. This admixture can suitably contain up to about 5 weight percent alcohol, preferably about 1 to 3 weight percent, alcohol. The preferable non-metallic admixture material is carbonaceous in nature suitably a bitumen such as asphalt or the like.

When used according to this invention, the higher fatty alcohols provide sufficient protection against root growth penetration to comply with the DIN 4038, Section 3.4 standards.

The protected admixture of this invention can be simply prepared by conventional mechanical mixing techniques.

The fatty alcohols of this invention are physiologically safe and have no offensive odor.

What is claimed is:

1. A root repelling composition which comprises an admixture of a root-repelling effective amount of a higher fatty alcohol which is a primary alkanol of about 6 to 24 carbon atoms with asphalt.

References Cited

UNITED STATES PATENTS

| | | | |
|---|---|---|---|
| 3,438,765 | 4/1969 | Tso et al. | 71—78 |
| 2,822,295 | 2/1958 | Barrett et al. | 117—138.5 |
| 2,586,681 | 2/1952 | McKay et al. | 71—122 |
| 2,903,330 | 9/1959 | Dressler | 260—632X |
| 3,025,150 | 3/1962 | Hessel | 71—122 |
| 3,159,476 | 12/1964 | Young | 71—122 |
| 3,205,059 | 9/1965 | Roberts | 71—122 |
| 3,210,174 | 10/1965 | Harshman | 71—127 |

FOREIGN PATENTS

| | | | |
|---|---|---|---|
| 963,461 | 7/1964 | Great Britain | 71—127 |
| 1,340,844 | 9/1963 | France | 71—127 |

OTHER REFERENCES

Boback, "Effect of Lauryl Alcohol on Mitotic Index, Etc." (1966), CA66 44322Y (1967), p. 4197.

Oertli, "Effects of Fatty Alcohols and Acids on Transpiration of Plants," Biol. Abst. 43, p. 1613 (1963).

LEWIS GOTTS, Primary Examiner

G. HOLLRAH, Assistant Examiner

U.S. Cl. X.R.

71—127

PO-1050
(5/69)

UNITED STATES PATENT OFFICE
CERTIFICATE OF CORRECTION

Patent No. 3551135     Dated December 29, 1970

Inventor(s) Joachim Putz et al.

It is certified that error appears in the above-identified patent and that said Letters Patent are hereby corrected as shown below:

Col. 1, line 9    (Spec. Declaration)

German Appl. No. "1,570,087" should be --D 47578--

Col. 2, lines 28 and 29    (Spec. p. 3, line 13)

"surfaces" should be --surface--

Col. 2, line 48    (Spec. p. 4, line 4)

"material" should be --materials--

SIGNED AND SEALED
MAR 9 1971

(SEAL)
Attest:

Edward M. Fletcher, Jr.
Attesting Officer

WILLIAM E. SCHUYLER,
Commissioner of Patents